United States Patent [19]

Korpman

[11] 4,080,348
[45] Mar. 21, 1978

[54] TACKY ADHESIVE

[75] Inventor: Ralf Korpman, Bridgewater, N.J.

[73] Assignee: Johnson & Johnson, New Brunswick, N.J.

[21] Appl. No.: 687,563

[22] Filed: May 18, 1976

[51] Int. Cl.$^2$ ............................................. C08L 93/00
[52] U.S. Cl. ................................................ 260/27 BB
[58] Field of Search ........................ 260/27, 894, 876

[56] References Cited

U.S. PATENT DOCUMENTS

| | | | |
|---|---|---|---|
| 3,239,478 | 3/1966 | Harlan | 260/27 R |
| 3,325,430 | 6/1967 | Grasley | 260/27 |
| 3,441,530 | 4/1969 | Bauer | 260/28.5 |
| 3,519,585 | 7/1970 | Miller | 260/27 |
| 3,632,540 | 1/1972 | Unmuth | 260/27 R |
| 3,649,579 | 3/1972 | Gobran | 260/27 |

Primary Examiner—Lewis T. Jacobs

[57] ABSTRACT

A highly tacky pressure-sensitive adhesive which possesses superior "finger tack" and skin adhesion, as well as the ability to adhere to oily surfaces. The adhesive comprises a thermoplastic component and a resin component and the thermoplastic component consists essentially of about 55–85 parts, preferably about 60–75 parts, of a simple A-B block copolymer wherein the A-blocks are derived from styrene and the B-blocks are derived from isoprene, and about 15–45 parts, preferably about 25–40 parts, of a linear or radial A-B-A block copolymer. The total styrene-derived A-block content of the copolymers is less than 20 percent of their total weight and the A-blocks of the A-B block copolymers constitute about 10–18, preferably about 12–16, percent by weight of the A-B copolymers. The resin component may be conventional.

5 Claims, No Drawings

TACKY ADHESIVE

The present invention relates to thermoplastic elastomeric pressure-sensitive adhesives and more particularly to such adhesives which are based on A-B-A block copolymers.

Such adhesives are disclosed generally in United States Letters Pat. No. 3,519,585, 3,676,202, 3,723,170 and 3,787,531. U.S. Pat. Nos. 3,676,202 and 3,723,170 disclose the advantages of these adhesives when the B-blocks are derived from isoprene and the A-blocks preferably are derived from styrene, including the advantages of particular tackifiers. Patents 3,519,585 and 3,787,531 disclose the advantages of mixing certain A-B block copolymers with certain A-B-A block copolymers in similar pressure-sensitive adhesive formulations.

I have discovered that superior "finger tack" and skin adhesion, as well as the ability to adhere to oily surfaces, can be attained with pressure-sensitive adhesive formulations employing particular types of A-B and A-B-A block copolymers in particular proportions. More specifically, the adhesive composition of this invention comprises a thermoplastic elastomeric component and a resin component and the thermoplastic elastomeric component consists essentially of about 55–85 parts, preferably about 60–75 parts, of a simple A-B block copolymer, and about 15–45 parts, preferably about 25–40 parts, of a linear or radial A-B-A block copolymer. The A-blocks are derived from styrene or styrene homologues in both the A-B and A-B-A block copolymers. In order to attain the desired properties of the adhesive of this invention, it is important that the total styrene-derived A-block content of the copolymers be not above about 20 percent by weight of the total block copolymers, and that the A-blocks of the A-B block copolymers constitute about 10–18, preferably about 12–16, percent by weight of the A-B copolymers. It also is important in this invention that the B-blocks of the A-B copolymers be derived from isoprene either alone or in conjunction with small proportions of other monomers. In these A-B copolymers, the number average molecular weight of the individual A-blocks should be about 7,000 – 20,000 and the total molecular weight of the block copolymer generally should not exceed about 150,000. A-B block copolymers based on styrene and isoprene are described generally in United States Letters Pat. No. 3,787,531.

The A-B-A block copolymers of this invention are of the type which consists of A-blocks (end blocks) derived, i.e., polymerized, from styrene or styrene homologues; and B-blocks (center blocks) derived from conjugated dienes, such as isoprene or butadiene, or from lower alkenes, such as ethylene and butylene, and polymers and copolymers thereof. The individual A-blocks have a number average molecular weight of at least about 7,000 preferably in the range of about 12,000–30,000, and the A-blocks constitute about 5–50 percent, preferably about 10–30 percent, by weight of the block copolymer. The number average molecular weight of the B-blocks for linear A-B-A block copolymers preferably is in the range of about 45,000–180,000 and that of the linear copolymer, itself, preferably is in the range of about 75,000–200,000. The number average molecular weight of the radial A-B-A block copolymers preferably is in the range of about 125,000 – 400,000, and that of the corresponding B-blocks preferably is about 95,000 – 360,000. The designation A-B-A includes what are sometimes called A-B-C block copolymers wherein the end blocks are different from one another but both are derived from styrene or styrene homologues. This applies both to linear and radial block copolymers.

The radial A-B-A polymers useful in this invention are of the type described in United States Letters Pat. No. 3,281,383 and conform to the following general formula: $(A-B-)_n X$, wherein A is a thermoplastic block polymerized from styrene or styrene homologues, B is an elastomeric block polymerized from a conjugated diene such as butadiene or isoprene, X is an organic or inorganic connecting molecule, with a functionality of 2–4 as described in Patent No. 3,281,383 or possibly with a higher functionality as described in the article entitled "New Rubber is Backed by Stars" appearing on page 35 of the June 11, 1975 issue of *Chemical Week*. "$n$" then is a number corresponding to the functionality of X.

The elastomeric component of the adhesive composition of this invention may include small amounts of other more conventional elastomers but these should not exceed about 25 percent by weight of the elastomeric component. These include natural rubbers, synthetic rubbers based on butadiene, isoprene, butadiene-styrene, butadiene-acrylonitrile and the like, butyl rubbers, and other elastomers.

The adhesive composition of this invention includes about 20–300 parts, preferably 50–150 parts, of the resin component per one hundred parts by weight of the thermoplastic elastomeric component. The resin component consists essentially of tackifier resins for the elastomeric component. In general any compatible conventional tackifier resin or mixture of such resins may be employed. These include hydrocarbon resins, rosin and rosin derivatives, polyterpenes, and other tackifiers.

The adhesive composition of this invention also may include small amounts of various other material such as antioxidants, heat stabilizers and ultraviolet absorbers, fillers, and the like. Typical antioxidants are 2,5 ditertiary amyl hydroquinone and ditertiary butyl cresol. Similarly, conventional heat stabilizers such as the zinc salts of alkyl dithiocarbamates may be used. Similarly, the particulate mixture of this invention may include small amounts of fillers and pigments such as zinc oxide, aluminum hydrate, clay, calcium carbonate, titanium dioxide, carbon black and others.

The adhesive composition of this invention exhibits superior "finger tack" and skin adhesion as indicated hereinbefore. This may be due, in part at least, to the fact that it possesses oil absorbing capacity since it also exhibits the ability to provide satisfactory adherence to oily surfaces.

Other and further advantages of the invention will appear to one skilled in the art from the following description, examples and claims.

The following examples are given only by way of illustration and are not intended to limit the scope of the invention in any way. Table A gives the adhesive composition formulations for Examples I-III. In the examples, all proportions are expressed in parts per one hundred parts by weight of the total elastomeric component unless otherwise indicated.

TABLE A

| Ingredients and Characteristics | Examples | | |
|---|---|---|---|
| | I | II | III |
| S-I Simple Block Copolymer - A | 70 | | |

TABLE A-continued

| Ingredients and Characteristics | Examples | | |
|---|---|---|---|
| | I | II | III |
| S-I Simple Block Copolymer - B | | 80 | |
| S-I Simple Block Copolymer - C | | | 80 |
| S-I-S Linear Block Copolymer (15%S) | 30 | | 20 |
| S-B-S Linear Block Copolymer (30%S) | | 20 | |
| Wingtack 95 Tackifier Resin | 70 | | |
| Wingtack 76 Tackifier Resin | | 60 | |
| Piccolyte S-115 Tackifier Resin | | | 55 |
| Zinc Dibutyl Dithiocarbamate | 2 | 2 | 2 |
| 2,5 Ditertiary Amyl Hydroquinone | 1 | 1 | 1 |

The S-I simple block copolymers A, B and C are as follows:

| Copolymer | No. Average Molecular Weight | Percent Styrene |
|---|---|---|
| A | 110,000 | 15 |
| B | 150,000 | 12 |
| C | 110,000 | 17 |

The S-I-S and S-B-S linear block copolymers each have a number average molecular weight of 125,000. As indicated in the table, the former contains 15 percent styrene and the latter contains 30 percent.

Wingtack 95 tackifier resin is a solid tackifier resin consisting predominantly of polymerized structures derived from piperylene and isoprene, with the ratio of piperylene to isoprene derived structures being at least about 8 or 9 to 1, and with the remainder being derived from mono-olefins. It appears to contain about 12–15 percent unsaturation based upon percentage of units in each molecule having a double bond. The said resin is polymerized from a stream of aliphatic petroleum derivatives in the form of dienes and mono-olefins having 5 or 6 carbon atoms all in accordance with the general teachings of the aforesaid United States Letters Pat. No. 3,577,398. This resin possesses a softening point of about 95° C by the ball and ring method, a number average molecular weight of about 1,100 and is offered commercially by Goodyear Tire and Rubber Company. Wingtack 76 is a similar solid tackifier resin offered by Goodyear which has a ball and ring softening point of about 76° C. Piccolyte S-115 tackifier resin is a beta pinene tackifier resin with a melting point of 115° C.

The above adhesive formulations are coated onto unified creped paper backing sheets and then dried. The resulting coated sheets are slit into one inch widths to form pressure-sensitive adhesive tapes. Each of the adhesives possesses superior "finger tack", i.e., the ability to stick to the finger when the finger is pressed against the adhesive side of the tape. In fact, the tapes exhibit superior skin adhesion when adhered to other parts of the body and in general are able to adhere to oily surfaces. Thus, they are suited for a variety of applications where adhesion is necessary despite the presence of some oil on the application surface.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A pressure-sensitive adhesive composition comprising a thermoplastic elastomeric component and a resin component; said thermoplastic elastomeric component consisting essentially of about 55–85 parts of a simple A-B block copolymer wherein the A-blocks are derived from styrene or styrene homologues and the B-blocks are derived from isoprene, and about 15–45 parts of a linear or radial A-B-A block copolymer wherein the A-blocks are derived from styrene or styrene homologues and the B-blocks are derived from conjugated dienes or lower alkenes, the A-blocks in the A-B block copolymer constituting about 10–18 percent by weight of the A-B copolymer and the total A-B and A-B-A copolymers comprising not above about 20 percent styrene; said resin component consisting essentially of about 20–300 parts of tackifier resin for said elastomeric component; all of said parts being parts per one hundred parts by weight of the thermoplastic elastomeric component.

2. A pressure-sensitive adhesive composition according to claim 1, wherein the styrene-derived A-blocks constitute about 12–16 percent by weight of A-B block copolymer.

3. A pressure-sensitive adhesive composition according to claim 1, which comprises about 60–75 parts of the A-B copolymer and about 25–40 parts of the A-B-A copolymer, per one hundred parts by weight of the thermoplastic elastomeric component.

4. A pressure-sensitive adhesive composition according to claim 1, wherein the styrene-derived A-blocks constitute about 5–50 percent by weight of the A-B-A block copolymer.

5. A pressure-sensitive adhesive composition according to claim 4, wherein the A-blocks constitute about 10–30 percent by weight of the A-B-A block copolymer.

* * * * *